March 9, 1937. W. L. McDONALD 2,073,264
AUTOMATIC SPEED CHANGE DEVICE
Filed Jan. 9, 1935 6 Sheets-Sheet 1

INVENTOR
William L. McDonald
BY Kenyon & Kenyon
ATTORNEYS

March 9, 1937.  W. L. McDONALD  2,073,264
AUTOMATIC SPEED CHANGE DEVICE
Filed Jan. 9, 1935  6 Sheets-Sheet 3

INVENTOR
William L. McDonald
BY Kenyon & Kenyon
ATTORNEYS

March 9, 1937.  W. L. McDONALD  2,073,264
AUTOMATIC SPEED CHANGE DEVICE
Filed Jan. 9, 1935  6 Sheets-Sheet 4

INVENTOR
William L. McDonald
BY Kenyon & Kenyon
ATTORNEY

March 9, 1937.  W. L. McDONALD  2,073,264
AUTOMATIC SPEED CHANGE DEVICE
Filed Jan. 9, 1935  6 Sheets-Sheet 6

Fig. 24.

INVENTOR
William L. McDonald
BY
Kenyon & Kenyon
ATTORNEYS

Patented Mar. 9, 1937

2,073,264

UNITED STATES PATENT OFFICE 2,073,264

AUTOMATIC SPEED CHANGE DEVICE

William L. McDonald, New York, N. Y.

Application January 9, 1935, Serial No. 1,075

31 Claims. (Cl. 74—336.5)

This invention relates to automatic speed change devices for automobiles and embodies, more specifically, an improved mechanism which operates automatically in accordance with the resultant of the combined speeds of the engine and of the car, said mechanism being flexible enough to permit the rate of automatic speed change to be varied.

Although speed change devices have been designed which operate automatically or semi-automatically in accordance with the speed of the vehicles, they have permitted of only a constant rate of automatic speed change with the result that the driver cannot vary the rate to suit his manner of driving or the conditions of the road.

It is, accordingly, a principal object of this invention to provide manually-operated mechanical means in connection with the aforesaid speed controlled means whereby the driver may determine the rate at which the automatic shift from one speed to another shall take place.

A further object of this invention is to provide a device of the above character which is simple in operation and capable of being incorporated in the conventional type of vehicle construction.

Other objects will appear hereinafter.

The invention will be best understood by reference to the accompanying drawings, showing the preferred form of construction in which.

Referring to the drawings, more particularly to Figs. 1, 2, 3, 4, 5, 6 and 7 thereof, 1 indicates a housing. Mounted in housing 1, in parallel relationship, are a shaft 2 connected by some suitable means as a bevel gear or the like with the engine driving shaft and a shaft 3 connected in the same manner with the car driven shaft; shaft 2 is rotatably journaled in bearings 4 and 5 and shaft 3 is rotatably journaled in bearings 6 and 7 provided in housing 1.

8 and 9 are two centrifugal governors mounted on shaft 2 and shaft 3 respectively. Upper arms 10 and 11 of governor 8 pivot in sleeve 12 which is rigidly mounted on shaft 2 and revolves with it. Similarly upper arms 13 and 14 of governor 9 pivot in sleeve 15 rigidly mounted on shaft 3. Lower arms 16 and 17 of governor 8 pivot in sleeve 18 which is slidably mounted on shaft 2; likewise lower arms 19 and 20 of governor 9 pivot in sleeve 21 which is slidably mounted on shaft 3; sleeves 18 and 21 are affixed to collars 22 and 23 respectively in which are set curved racks 24 and 25 loosely mounted on shafts 2 and 3 respectively but restrained from revolving with them; curved racks 24 and 25 engage pinions 26 and 27 respectively, said pinions being eccentrically and rigidly mounted on shafts 28 and 29 respectively, said shafts 28 and 29 being journaled in suitable bearings in housing 1 as 69 and 70, shown for shaft 29 in Figure 4. The movement of the curved racks 24 and 25 and pinions 26 and 27 give shafts 28 and 29 a rotary motion proportional to that of shafts 2 and 3.

On extensions of shafts 28 and 29 are mounted eccentrics 30 and 31, each grooved around the periphery to receive eccentric bands 32 and 33 respectively; band 32 has an extending portion 34, as has band 33 an extending portion 35; extension portion 34 is connected to lug 36 on bar 38 which has slot 39; similarly extension portion 35 is connected to lug 37 on the said slotted bar 38.

Figure 4:
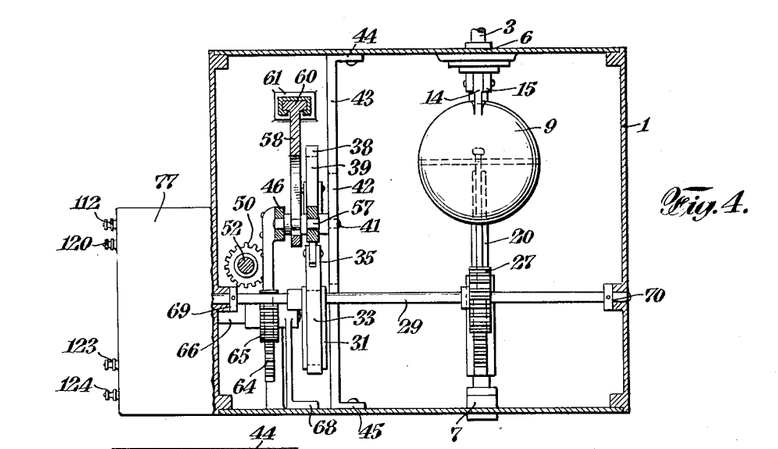
Fig. 4 is a sectional view taken on the line 4—4 of Fig. 1.
Figure 5:
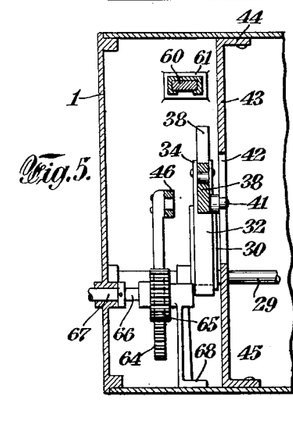
Fig. 5 is a sectional view with some of the parts removed taken on the line 5—5 of Fig. 1.
Figure 6:
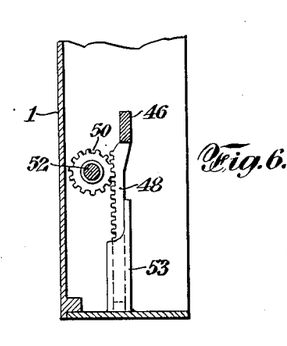
Fig. 6 is a sectional view with some of the parts removed taken on the line 6—6 of Fig. 1.
Figure 7:
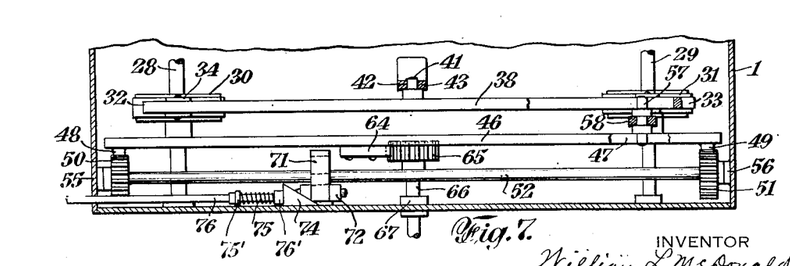
Fig. 7 is a sectional view taken on the line 7—7 of Fig. 1.
Figure 8:
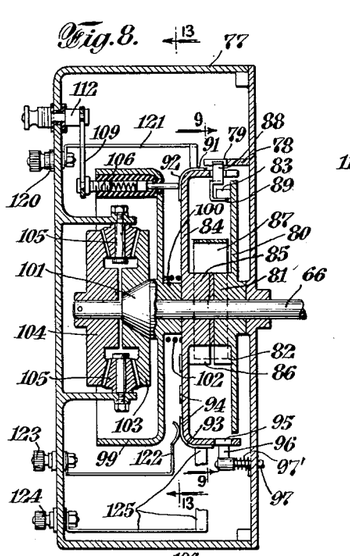
Fig. 8 is a cross-sectional view of the electrical contact device through which the speed controlled means electrically operates the members causing the gears to be shifted.

Slotted bar 38 has a central lug 40 containing a pin 41 which rides in the slot 42 of bar 43 which has a position parallel to and midway between shafts 2 and 3; bar 43 is mounted at 44 and 45 in the housing 1 (see Fig. 4).

In front of bar 38 and in a plane parallel to it is a second bar 46 having a slot 47 which is so arranged as to always move parallel to itself and perpendicular to bar 43. This is accomplished as follows:—At either end of bar 46 are affixed racks 48 and 49 which mesh with pinions 50 and 51 respectively which are rigidly mounted on bar 52. Rack 48 slides in slotted support member 53, while rack 49 likewise slides in slotted member 54; these supports 53 and 54 are affixed to housing 1. Shaft 52 is rotatably journalled in bearings 55 and 56 provided in housing 1.

Bars 38 and 46 are connected by a pin 57 mounted on some suitable means as a block to slide in the slot 47 of the bar 46, said pin 57 extending through slot 39 in bar 38. Because of pin 57, bar 46 accompanies bar 38 in its upward or downward movement. It will be seen that when pin 57 is moved horizontally, the bar 46 will be raised or lowered to the point where the two slots 39 and 47 coincide because of pin 57. The position of pin 57 is controlled by member 58, having slot 59 wherein is held said pin 57; member 58 is attached to a rod 60 sliding in sleeve 61 mounted at 62 and 63 in housing 1, as shown. Rod 60 is manually controlled by the driver through an extension to the steering column or cowl (not shown in the drawings).

On bar 46 is mounted a rack 64 which meshes with pinion 65; pinion 65 is rigidly mounted on shaft 66 which is rotatably journalled in bearing 67 in housing 1 (see Figs. 5 and 7) and is furthermore provided with support 68 affixed to said housing 1. By means of rack 64 and pinion 65, shaft 66 will be given a rotary motion which is proportional to the resultant of the speed of rotation of shaft 2 and the speed of rotation of shaft 3.

A hook member 71 (see Fig. 1; also Fig. 7 where member 71 is shown in top view) is provided to hook over bar 46 and prevent it from rising to second gear position, when reverse gear is desired. The shank of 71 is so pivoted at 72 that member 71 normally pivots away from bar 46 and falls back against housing 1. However, member 71 may be caused to pivot at 72 and turn in the direction of bar 46 when wedge 74 is pushed against resistance between housing 1 and the shank or side of member 71. The hook of member 71 is of such a length that when bar 46 is down to neutral, said hook member being so caused to pivot, will pass over it and allow bar 46 to rise within the hook to the first, or, in this case, reverse gear position but not further (i. e., to second gear position). Wedge 74 is mounted on shaft 76 which is slidably mounted in block 76' fixed to housing 1. Wedge 74 normally is resiliently held against block 76' by pressure spring 75 intermediate between block 76' and stop 75' affixed to shaft 76; shaft 76 extends extraneous to housing 1 on the floorboard of the car for operation as by a heel button. When the pressure on shaft 76 and against spring 75 is released, the tension in spring 75 will cause shaft 76 to slide back and carry wedge 74 from between housing 1 and the shank or side of member 71 to its normal position against block 76'.

The electrical contact device, Figs. 8 to 13, is constructed as follows: 77 designates a housing affixed to housing 1 to contain said device (see also Fig. 4). Also affixed to said housing 1 is a semi-circular shaped member 78 provided with openings 79 which are spaced to represent the points of shifting gears.

On the extension of shaft 66 is rigidly mounted a disc 80 having a hub 81 from which projects a lug 82; a second lug 83 is located near the periphery of wheel 80; both hub 81 and lug 83 project on the inner side. Facing disc 80, a rotating cup-shaped member 84, having a projecting hub 85 with lug 86 thereon, is loosely mounted on shaft 66. Between disc 80 and member 84 and surrounding their hubs 81 and 85 is a circular leaf spring 87 whose ends engage lugs 82 and 86. Leaf spring 87 is provided to keep disc 80 and member 84 normally with relation to each other, in a neutral position.

On the inner surface of member 84, on the flange thereof, is affixed a double pawl 88 having hooked extension members 89; the ends of double pawl 88 pass through openings 90 in the rim of member 84 and through openings 79 in member 78. There are only two openings 90 and they are so spaced as to cover two openings 79. The hooked extension members 89 are provided to engage the lug 83 on the inner side of disc 80.

Mounted on the outer side of the flange of cup-shaped member 84 is a metal contact plate 91 extending sufficiently far around said flange to cover the various gear shifts. A projection 92 extends from plate 91 across the outer flat surface of member 84, to a position where it will make a contact to be hereinafter described. Also mounted on the outer side of cup-shaped member 84, but directly opposite to the contact plate 91, is a metal contact plate 93 having four projections 94 extending over the outer flat surface of member 84 sufficiently far to make contacts to be later described. Contact plate 93 and extensions 94 are so spaced that contact through one of the four contact plates 93 will be made when member 84 is in its midway shifting position.

Figure 14:
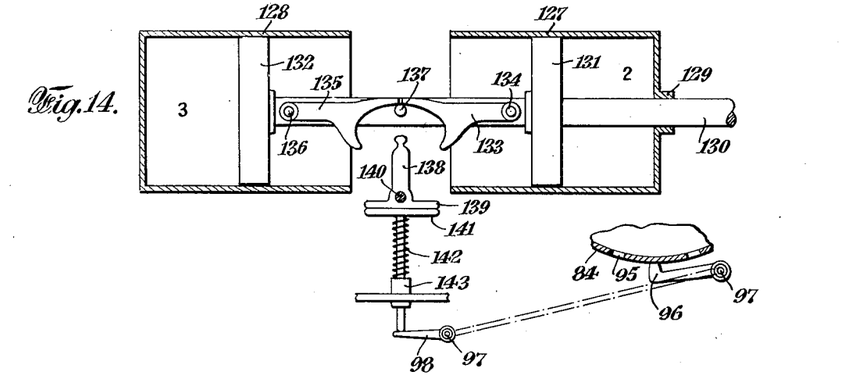
Fig. 14 is a cross-sectional side view of the means operating to release the device for holding the electrical contact device in contact position and a diagrammatic representation of said holding device.

Three openings 95 are provided in the flange of cup-shaped member 84, and are so placed as to be opposite the midpoints between openings 79 in member 78. These openings 95 are provided to engage a pawl 96 which is rigidly mounted on a rod 97 rotatably mounted in and extending extraneous to housing 77 to run beneath the gear shift rods 130 and 152 (see Fig. 14 showing position of rod 97 under rod 130). Rod 97 is so mounted, as in conjunction with a spring 97' that it will act to keep pawl 96 pressed against the flange of member 84, so that, when member 84 turns, pawl 96 will slip into openings 95 therein. 98 (see Fig. 14) is a lever or extension member rigidly mounted on bar 97 as shown directly below the gear shift rod 130 operating second and third gear. There is another corresponding extension member 98 (not shown) also rigidly mounted on rod 97 but directly beneath gear shift rod 152 operating first and reverse gears. When either member 98 is pushed down, it will rotate rod 97 so that pawl 96 rigidly mounted thereon will be withdrawn from whichever opening 95 it happens to be engaging in cup-shaped member 84. The first opening 95 is so shaped or sloped that lug 96 will, on the decreasing speed rotation of member 84, slide readily from that opening 95 to the flange of member 84 without the operation of the release mechanism.

Next to member 84 there is also loosely mounted on shaft 66 another cup-shaped member 99 having a square hub 100 and cone-shaped hub 101; between members 99 and 84 is a coil spring 102. A friction gear 103 rides on the cone-shaped hub 101 and tends to move with it. 104 is a gear keyed to shaft 66 and complementary to gear 103. Between friction gears 104 and 103 are spur pinions 105, mounted on projections of housing 77, and meshing on either side with members 104 and 103. By this arrangement, cup-shaped member 99 is caused to move in an opposite direction to cup-shaped member 84.

Members 106, 107 and 108 (see Figs. 8 and 13) are contact pins, slidably mounted on cup-shaped member 99, making contact with member 92; member 109 is a contact link between pin 106 and binding post 112, said link being slotted so as to freely slide over the neck of said post. Slidably mounted on post 112 is a contact plate 113 normally in contact with contact member 114 leading to the mechanism operating low gear (see Fig. 13). Plate 113, however, may be slid by means of rod 115, journalled in bearing 116 in housing 77, out of contact with member 114, and into contact with member 117 leading to the mechanism operating reverse. Rod 115 is operated by the driver at reverse and is connected as by some suitable means as a Bowden wire to shaft 76 so that it may be actuated as by the same heel button. 110 is a slotted link between pin 107 and binding post 118 leading to second or intermediate gear and 111 is a slotted link between pin 108 and binding post 119 leading to mechanism operating third or high gear. The binding posts 112, 118 and 119 are affixed to housing 77.

Contact from the clutch pedal is made through binding post 120 to brush member 121 which contacts plate 91 on member 84. Contact to the clutch opening mechanism is made through one of the extensions 94 of plate 93, contact member 122 and binding post 123. Contact from the battery is made through binding post 124 to brush member 125 which contacts plate 93.

Figure 9:
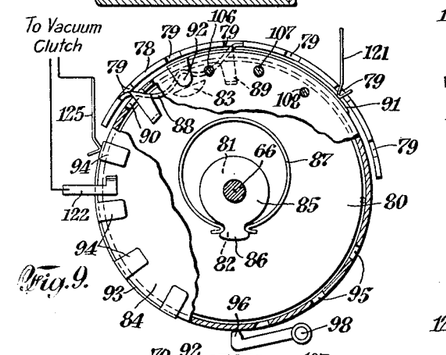
Fig. 9 is a sectional view taken on the line 9—9 of Fig. 8.
Figure 10:
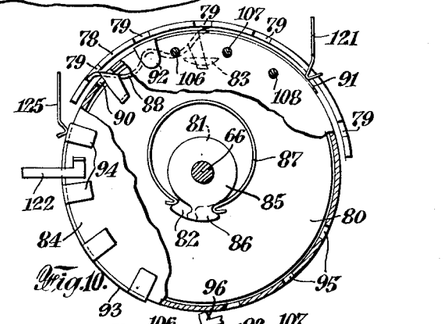
Fig. 10, Fig. 11 and Fig. 12 disclose the structure of Fig. 9 in different positions for the purposes of this invention.
Figure 11:
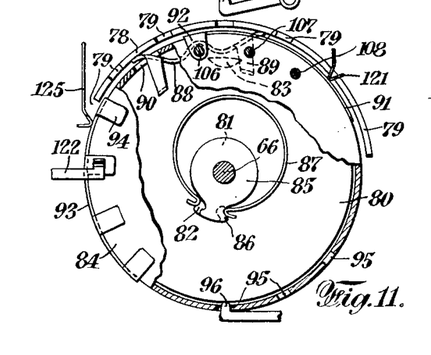
Figure 12:
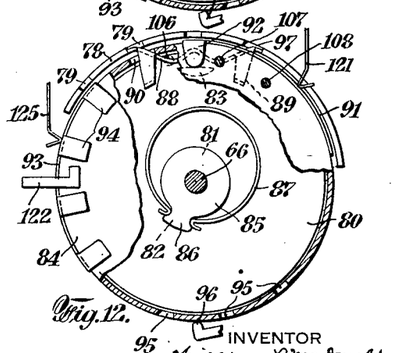
Figure 13:
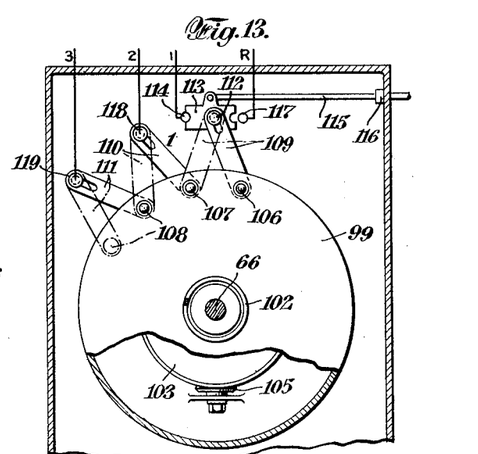
Fig. 13 is a sectional view taken on the line 13—13 of Fig. 8.

The operation of the above electrical contact device is as follows:—The positions of disc 80, cup-shaped member 84, pawl 88 and its extension members 89, lug 83 on disc 80, leaf spring 87 and lugs 82 and 86 as shaft 66 begins to revolve because of the movement of bar 46 is shown in Fig. 9. Disc 80 is held by the forward end of pawl 88. As shaft 66 continues to turn, carrying disc 80 with it, lug 82 on disc 80 and lug 86 on member 84 gradually separate expanding leaf spring 87 until an extension member 89 on pawl 88 is engaged with lug 83 on disc 80 and pawl 88 is released from opening 79 in member 78 (see Fig. 10). When thus released, cup-shaped member 84 because of the tension in spring 87, tends to return to its normal position with respect to disc 80. But this movement is checked halfway by pawl 96 dropping into the first of the openings 95 situated in the opposite side of the flange of member 84 and opposite the midway point between two of the openings 79 in member 78 (see Fig. 11).

In this position, member 84 makes the contact which sets up a circuit from the battery through post 124, brush member 125, plate 93, projection 94 thereof, contact member 122 and through binding post 123 to the mechanism operating to open the clutch. As the clutch is opened, a mechanism (see Figs. 18, 19, 20 and 21) to be hereinafter described, brings the gears to neutral before any shifting impulse is applied. When the clutch is entirely open, it makes a contact (see Fig. 24) to be hereinafter described, which sets up a circuit through binding post 120, brush member 121, plate 91, projection 92 thereof, contact pin 106, contact link 109, binding post 112, contact plate 113 and contact member 114 to mechanism operating low gear. As the rod controlling this set of gears moves, it cooperates with lever or extension member 98 on rod 97 to turn said rod 97 to release pawl 96; and cup-shaped member 84 because of tension of leaf spring 87, passes to its normal position with respect to disc 80. The electrical contacts are then broken, the clutch is closed, and pawl 88 engages the next 79 space ready for the next shift to intermediate or second gear. The parts will be found to have taken the position disclosed in Figure 12.

In effecting the second gear shift, the members operate in the same manner, but as disc 80 has advanced, and with it the cup-shaped member 84, the contact to open the clutch will be made through the next 94 projection of plate 93 on member 84; pawl 96 will engage the second or middle opening 95 in member 84 and the gear-operating circuit will now be made through binding post 120, brush member 121, plate 91, projection 92 thereof, contact pin 107, contact link 110 through binding post 118 to the mechanism operating second gear. High gear is obtained with pawl 96 engaging the third opening 95 in member 84 and with contact through contact pin 108, contact link 111 through binding post 119 to the mechanism operating high gear.

During the advance in speed, disc 80 and member 84 turn in one direction while member 99, because of the action of spur pinions 105 rotates in the opposite direction. In decreasing speed disc 80 and member 84 turn in a direction the reverse of that in increasing speed until lug 83 on disc 80 releases the opposite end of pawl 88 and pawl 96 engages the third opening 95 in member 84. This would bring member 84 to a position where contact member 92 would connect again with direct drive pin 108, with the result that there would be no action as gears would be already in direct drive.

To correct this result gear 104 and pinions 105 are provided to turn member 99 in the direction opposite to that of disc 80 and member 84. As the relative motion is the same but opposite, member 99, carrying contact pins 106, 107 and 108, will bring contact pin 107, leading to second gear, to take the position previously held by contact pin 108, leading to direct drive, with the result that member 92 contacts to second gear. See Fig. 13.

The mechanism by which lever or extension member 98 is operated to release pawl 96 from openings 95 in member 84 is shown for one of the two gear shift rods in Figs. 14 to 17. See also Figs. 22, 23 and 24 for assembled relationship. 127 and 128 designate housings for third gear and second gear cylinders respectively; mounted at bearing 129 in housing 127, is gear shift rod 130 having plungers 131 and 132 mounted thereon. 133 is a pawl pivotally mounted on rod 130 at 134; 135 is a pawl also pivotally mounted on rod 130 at 136. The pawls 133 and 135 normally rest, as shown, on stud 137 on rod 130. Beneath pawls 133 and 135 is a T-shaped lever arm 138 having cross bar 139; lever arm 138 is pivotally mounted on rod 140. Below lever arm 138 is a yieldable head piece 141 around the shaft of which is wound coil spring 142; member 141 is mounted on support 143. As shown the shaft of 141 contacts extension member 98.

Figures 18, 19, 20, 21, 23:
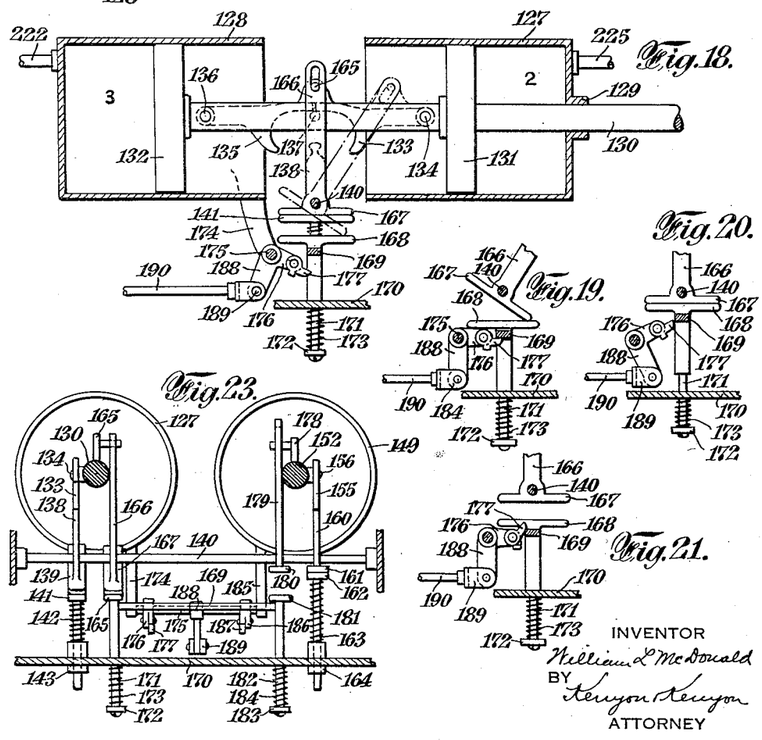
Fig. 18 is a cross-sectional side view of the means for bringing the gears to neutral before shifting.
Fig. 19, Fig. 20 and Fig. 21 are detail views of a part of the structure of Fig. 18 in different positions for the purposes of this invention.
Fig. 23 is an end view of the structure disclosed in Fig. 22.
Figure 22:
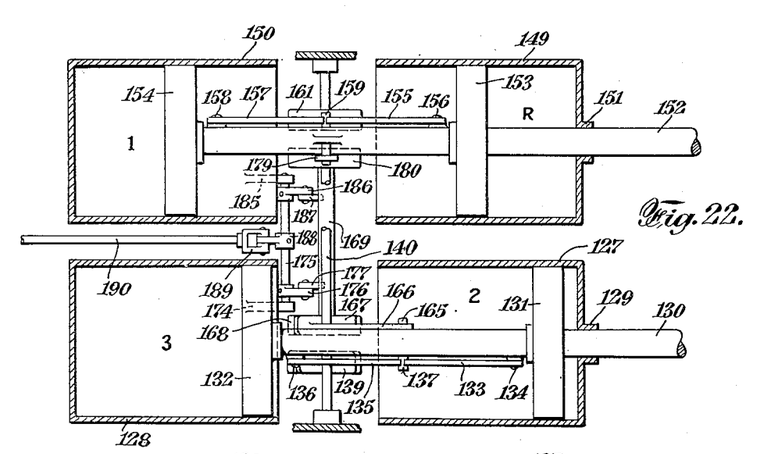
Fig. 22 is a top view in assembled relationship of the structures shown in Figs. 14, 15, 16, 17, 18, 19, 20 and 21.

In Fig. 22 the members operating in connection with the low gear and reverse cylinders corresponding to members 129 to 137 inclusive and 139 in third gear and second gear cylinders are designated 149 to 159 inclusive and 161. In Fig. 23, the members operating in connection with the low gear and reverse cylinders corresponding to members 127, 130, 133, 134, 138, 139, 141, 142 and 143 in the high gear and second gear cylinders are designated 149, 152, 155, 156, 160, 161, 162, 163 and 164 respectively.

Figure 15:
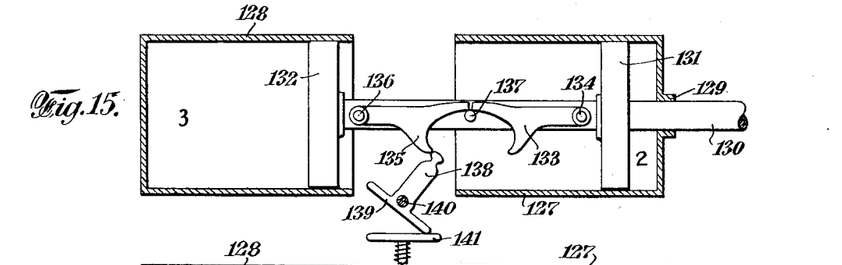
Fig. 15, Fig. 16 and Fig. 17 disclose the releasing means of Fig. 14 in different positions for the purposes of this invention.
Figure 16:
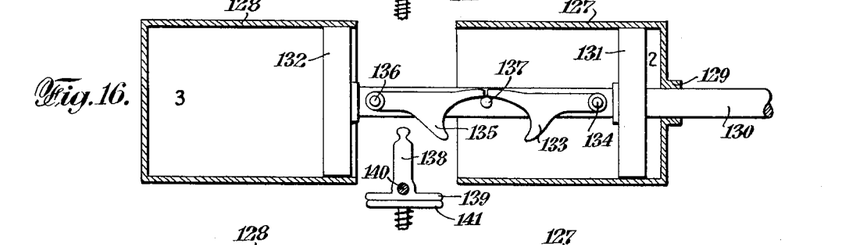
Figure 17:
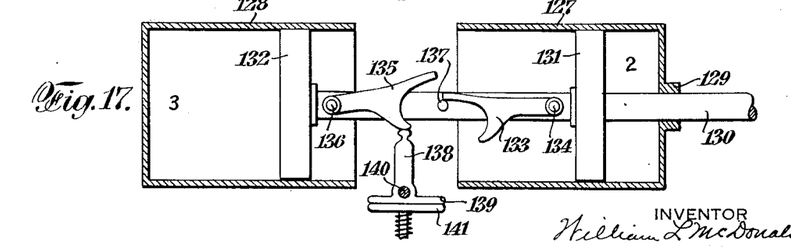

The pawls 133 and 135 operate to release pawl 96 from openings 95 in the following manner:— When gear shift rod 130 is carried from a position as in Fig. 14 to a position as in Fig. 15 (second gear shift) pawl 135 comes in contact with lever arm 138 and causes it to take the position shown and to depress the yieldable head piece 141. The pressure depresses extension 98 causing bar 97 to be turned and to carry with it pawl 96 withdrawing said pawl 96 from opening 95. The length of lever arm 138 is such that when the gear is entered lever 138 passes by lug 135 and resumes its normal vertical position as shown in Fig. 16. When the shifting rod 130 is carried back to neutral, lug 135 is raised by the end of lever arm 138 and passes over said lever arm and all parts return to the position shown in Fig. 14. When gear shift rod 130 is carried by the third gear shift in the opposite direction, lug 133 will cause lever arm to take a position to depress yielding head member 141, with the result described above. It is to be understood that for the cylinders operating second gear and reverse the movements of gear shift rod 152 will cause the corresponding members mounted thereon to act in the same way with the result that yieldable head member 162 will depress the corresponding extension member 98 to turn bar 97.

The mechanism by which the gears are brought to neutral before any shifting impulse is applied is shown for second and third gears in Figs. 18 to 21. See also Figs. 22, 23 and 24 for assembled relationship with third gear and reverse. Member 165 is a lug mounted on gear shift rod 130 having a projection to engage slotted T-shaped lever arm 166 having cross-piece 167; said lever arm 166 is pivotally mounted on rod 140. Opposing cross-piece 167 is a T-shaped arm 168 near the neck of which is shown the end of a bar 169; said arm 168 is held in a vertical position on a housing 170 by a bolt 171 which extends extraneous to housing 170 and which when arm 168 is raised will slide through said housing 170. Between the nut 172 on said bolt 171 and housing 170 is a coil spring 173. On extension 174 from housing 128 is mounted one end of rod 175; on this end of rod 175 is rigidly mounted a trigger-finger 176 with pivoted pawl 177 so placed as to raise member 168 by striking upward against bar 169 joined thereto. Members cooperating with the low-reverse gear shift rod 152, corresponding to members 165, 166, 167, 168, 171, 172, 173, 174, 176 and 177 are designated 178, 179, 180, 181, 182, 183, 184, 185, 186 and 187 respectively and are shown in Figs. 22 and 23.

Bar 169 extends between the neck of T-shaped arm 168, acting in relation to gear shift rod 130 and the neck of T-shaped arm 181, acting in relation to gear shift rod 152. Similarly bar 175 extends between trigger-finger 176 and trigger-finger 186 and is mounted near the latter trigger-finger 186 on extension 185 of housing 150. By lever arm 188 rigidly mounted on bar 175 at its center, said bar 175 is caused to rotate so as to raise trigger-fingers 176 and 186. Lever arm 188 is pivoted on head 189 of rod 190 connected with the clutch release as shown in Fig. 24.

The operation of the above described device for one of the gear shift rods 130, operating direct drive and second gear, is shown in Figs. 18 to 21. Because of the movement of gear shift rod 130 into gear position, T-shaped lever arm 166 will be caused to pivot on rod 140 with one end of its cross piece 167 resting on the cross piece of arm 168. See Figs. 18 and 19. When the clutch is released the push on rod 190 will cause lever arm 188 to rotate rod 175 so that the point 177 of trigger-finger 176 will lift bar 169 and with it member 168. This upward movement will cause lever 166 to pivot back on rod 140 and take the vertical position shown in Fig. 20 with the result that gear shift rod 130 will be brought back to neutral position. When lever arm 166 reaches the position shown in Fig. 20, point 177 of trigger-finger 176 turns on its pivot and being of proper length to allow of its slipping past bar 169, and arm 166 returns to the position shown in Fig. 21. When the clutch is closed rod 190 is pulled back, with the result that trigger-finger 176 and its point 177 return to the position shown in Fig. 18. When a gear is shifted, lever arm 166 pivots on bar 140 to a position as shown in Fig. 18. It is to be understood that gear shift rod 152 operating low gear and reverse is brought back to neutral position in the same manner by the effect of the pushing action of rod 190, the turning of lever arm 188, and the resulting rotation of rod 175 on trigger-finger 186 with point 187, causing said point 187 to lift bar 169 and with it member 181. The rise of member 181 will cause member 179 to pivot back on rod 140 and resume its vertical position so as to bring gear shift rod 152 to neutral.

Figure 24:
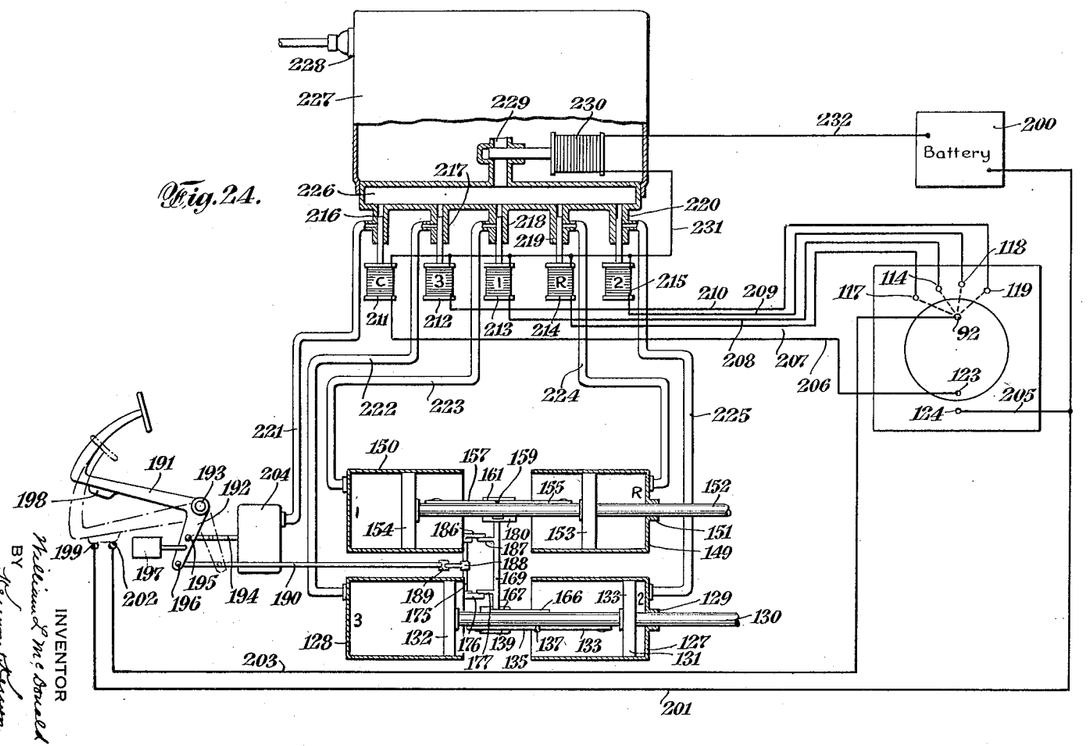
Fig. 24 is a diagrammatic view of part of the device.

In Fig. 24 which is a diagrammatic view of part of the system showing the relationship of the electric circuits, vacuum tank and vacuum lines, the clutch and gear shift cylinders which are situated between the driving and driven shafts (not shown), 191 designates the clutch pedal having lever arm 192 which pivots at 193 because of the movement back and forth of cylinder rod 194 affixed to arm 192 at 195. At 196 on lever arm 192 is affixed rod 190. Lever arm 192 may be provided with a dash-pot at 197 or other well-known device to ease the clutch in to avoid clashing. On clutch pedal 191 is mounted a contact plate 198 which, when the clutch pedal has completed its stroke, bridges contact 199 connected from the battery 200 by lead 201 and contact 202 connected to extension 92 of contact plate 91 by way of lead 203. 204 is the vacuum cylinder actuating rod 194 to open and close the clutch.

205 is the lead from the battery wire 201 through binding post 124 to brush member 125. From binding post 123, contact members 117 and 114, and binding posts 118 and 119, are leads 206, 207, 208, 209, 210 to solenoids 211, 214, 213, 215, 212 which operate to open and close the valves 216, 219, 218, 220 and 217 of vacuum lines 221, 224, 223, 225 and 222 leading to the clutch, reverse, low gear, second gear and third gear cylinders respectively. The said vacuum lines 221, 224, 223, 225 and 222 all lead into the manifold chamber 226 of vacuum tank 227 which is provided with an inlet valve 228 connected with the manifold of the engine (not shown). From the manifold chamber 226 to the main tank 227, there is a main outlet valve 229 which is opened and closed by solenoid 230 within tank 227. From solenoids 211, 214, 213, 215 and 212 is lead 231 to solenoid 230 and from the battery 200 is lead 232 to solenoid 230.

The operation of the foregoing mechanism will be apparent from its description. When the engine is started, driving shaft 2 revolves and turns with it, governor 8, which, through its raising action on rack 24, turns pinion 26 which carries shaft 28 with it, causing eccentric 30 to ascend. Through extension 34 of band 32 on eccentric 30 the nearer end of the bar 38 is then caused to be raised. If the manual control member 58 is set over the drive shaft 3, there will be no motion of the car because bar 46 will not be moved whatever the speed of the engine. The speed controlled parts and the members of the electrical contact device will have the position shown in Fig. 1 and Fig. 9, respectively. Therefore, to set the car in motion it will be necessary for the driver to draw the manual control member 58 by means of bar 60, further in toward bar 43 along bar 46. This will result in bar 46 being raised parallel to itself, and in consequence rack 64 will be carried up to turn pinion 65 and with its shaft 66 with disc 80 mounted thereon. Said disc 80 will turn until it reaches the position shown in Fig. 10. Cup-shaped member 84 which has been restrained by the end of pawl 88 engaging opening 79 in member 78, as in Fig. 9, is then released. Tending to resume its normal position with respect to disc 80, member 84 is held midway in its contact position by pawl 96 engaging first opening 95 in its flange as above described. At this point a circuit will be established from the battery 200 through lead 205, binding post 124, brush member 125, plate 93 and projection 94 thereof on member 84, contact member 122, binding post 123, lead 206 to energize solenoid 211 to open valve 216 of vacuum line 221, leading from vacuum cylinder 204 operating to release clutch 191 by drawing in cylinder rod 194. At the same time that solenoid 211 is energized current is carried therefrom by lead 231 to energize solenoid 230, within the main vacuum tank 227, to open the main outlet valve 229.

As clutch pedal 191 descends, rod 190 is pushed in to bring the gear shift rods to neutral position as above described. When clutch pedal 191 completes its stroke, contact plate 198 thereon bridges contacts 199 and 202 and a circuit is set up from the battery 200 through lead 201, contact member 199, contact plate 198, contact member 202, lead 203, binding post 120, brush member 121, plate 91 and projections 92 thereof, contact pin 106, contact link 109, binding post 112, contact plate 113, contact member 114, lead 208 to energize the solenoid 213 to open valve 218 of vacuum line 223 leading from the vacuum cylinder operating gear shift rod 152 to mesh the low gears. The movement of rod 152 in meshing the low gears will cause pawl 96 to be released from the first opening 95 as above described. Member 84 will then advance to its normal position with respect to disc 80; the electric contacts will be broken and member 84 will be restrained by pawl 88 engaging the next opening 79 ready for the shift to second gear.

Figure 1:
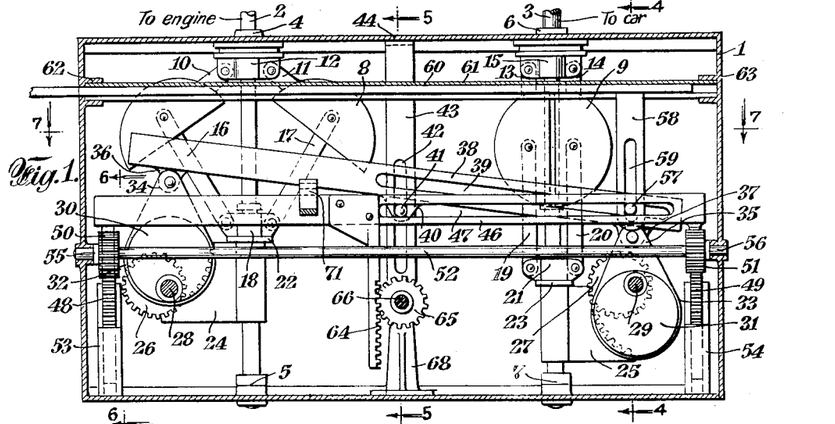
Fig. 1 is a side view of the parts of the speed controlled means and the manually operated means connected therewith, associated with the driving and driven shafts of the automobile. The car is in neutral position with the engine idling.
Figure 2:
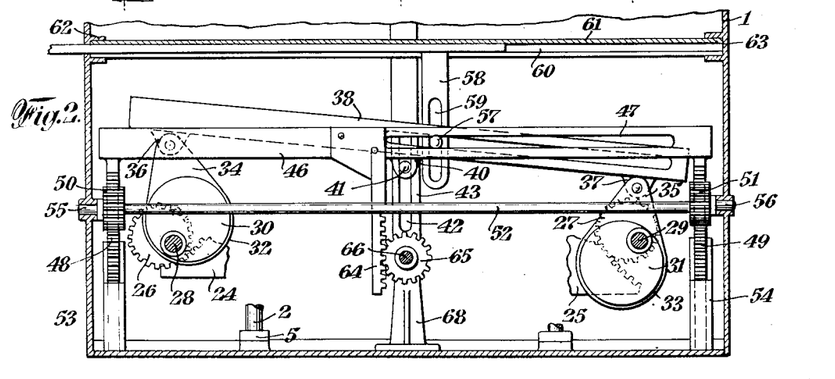
Fig. 2 is a side view of the same with some of the parts removed. The car is in the intermediate speed position.
Figure 3:
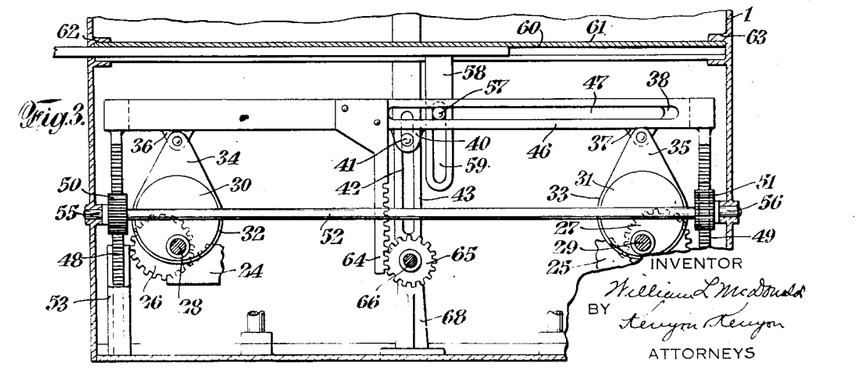
Fig. 3 is a side view of the same with some of the parts removed. The car is in the advanced speed position.

As the car starts to move in low gear, drive shaft 3 begins to revolve and turns with it, governor 9 which raises rack 25 and consequently turns pinion 27 and eccentric 31, causing the nearer end of bar 38 to gradually rise toward the level of its other end as in Fig. 2. Because of pin 57, bar 46 will accompany bar 38 in its rise but always parallel to itself. Shaft 66 will therefore turn further and carry disc 80 to the position where it acts to release member 84 and allows it to assume its contact position. The clutch will be released and the gears brought to neutral as described above and the clutch will make the circuit from the battery 200 but since projection 92 on plate 91 on member 84 is now contacting pin 107 the circuit will be completed through contact link 110, binding post 118, lead 209 to energize solenoid 215 to open valve 220 of vacuum line 225 leading from vacuum cylinder operating gear shift rod 130 to mesh second gear. Pawl 96 will be released as heretofore described, member 84 will assume its normal position and be held ready for the shift to high gear which will be effected in the same manner by bars 38 and 46 rising to the position as shown in Fig. 3. The circuits may easily be traced on Fig. 24.

In decreasing speed, as above noted, disc 80 turns in its reverse direction releasing the opposite end of pawl 88. Cup-shaped member 84 then tends to return to the normal position with respect to disc 80 but is checked halfway by pawl 96 engaging the third opening 95 in member 84. But, as above described, because of the counter movement of member 99, contact member 92 contacts pin 107 leading to second gear. Lug 96 is then released by the movement of gear shift rod 130 operating upon extension lever 98.

If the speed continues to decrease, disc 80 will continue to turn in its reverse direction releasing pawl 88 and lug 96 will engage the second opening 95 in member 84 with the result that contact member 92 will contact pin 106 leading to low gear. Lug 96 will then be released by the movement of gear shift rod 152.

Upon the speed further decreasing until the car is brought to a stop, disc 80 will turn further in its reverse direction releasing pawl 88. Cup-shaped member 84 will tend to return to normal position with respect to disc 80. Lug 96 will then enter the first opening 95 but because of the sloped shape of said opening 95 will slide out of it allowing cup-shaped member 84 to resume its normal position with respect to 80. The sloped shape of the first opening 95 is necessitated by the fact that at this point contact member makes no pin contact which would result in a gear shift rod movement to release lug 96. However, at this point the clutch opening contact will be made by which the gears are brought to neutral.

The operation of the device in reverse has been described above (see Fig. 24 for circuits).

It will be apparent that the driver may regulate the rate at which the gear shifts succeed one another by sliding bar 60 and member 58 affixed thereto, to draw pin 57 horizontally along the slot of bar 46. The further said pin 57, connecting bars 38 and 46, is drawn toward the center vertical bar 43, as in Figs. 2 and 3, the more will bar 46 be raised or lowered so that the slot in bar 46 will tend to more closely coincide with the slot in bar 38. Therefore the further toward vertical center bar 43, pin 57 is drawn the less time, with any degree of the speed of engine or car, will bar 46 take to respond to the upward or downward movement of bar 38 which is raised or lowered in accordance with the resultant speed of the engine and drive shafts.

When the driver wishes to go into reverse, rod 115 is actuated to slide contact plate 113, mounted on post 112, out of contact with member 114 leading to low gear and into contact with member 117 leading to reverse. As shown above, in order to keep bar 46 from rising from its first gear position (now contacted to reverse) and thus carry the shift to second gear, the heel button (not shown) at reverse is pressed to actuate rod 76 so that it will cause hook member 71 to hook over bar 46 when down to neutral; bar 46 within the hook will then rise not higher than first gear (now reverse) position. After the reverse motion has started, the control button is released; rod 76 slides back because of spring 75 to its normal position allowing wedge 74 to return from between the side of shank of hook member 71 and housing 1. When bar 46 goes down to neutral (below hook of hook member 71), said hook member 71 falls out of contact with bar 46 back against housing 1. Reverse position will then be automatically cleared and bar 46 will rise to its position actuating low gear and on up to the other gear positions.

While the invention has been described in connection with the specific construction shown in the accompanying drawings, it is obvious that changes in construction, form and arrangement of parts may be made without departing from the scope of the invention. The actual shifting may be made by compressed air or electric solenoids and other changes may be made. I therefore do not want to be limited to the precise details of construction set forth, but desire to avail myself of such variations and modifications as come within the scope of the appended claims.

I claim as my invention:

1. In a device of the class described, the combination of a first shaft, a second shaft, a clutch, clutch release mechanism and speed change mechanisms between said shafts, means for automatically actuating said mechanisms in accordance with the speed of rotation of the first shaft and with the speed of rotation of the second shaft and means to regulate the automatically actuating means so as to vary the rate of operation of the speed change mechanisms.

2. In a device of the class described, the combination of a first shaft, a second shaft, a clutch, clutch release mechanism and speed change mechanisms between said shafts, means for automatically actuating said mechanisms in accordance with the speed of rotation of the first shaft and with the speed of rotation of the second shaft and manually operated means to regulate the automatically actuating means so as to vary the rate of operation of the speed change mechanisms.

3. In a device of the class described, the combination of a driving shaft, a driven shaft, a clutch, clutch release mechanism and speed change mechanisms between said shafts, means for actuating said mechanisms in accordance with the speed of rotation of the driving shaft and with the speed of rotation of the driven shaft and means to regulate the actuating means so as to vary the rate of operation of the speed change mechanisms.

4. In a device of the class described, the combination of a driving shaft, a driven shaft, a clutch, clutch release mechanism and speed change mechanisms between the said shafts, means for actuating said mechanisms in accordance with the speed of rotation of the driving shaft and with the speed of rotation of the driven shaft and manually operated means to regulate the actuating means so as to vary the rate of the operation of the speed change mechanisms.

5. In a device of the class described, the combination of a driving shaft, a driven shaft, a clutch, clutch release mechanism and speed change mechanisms between said shafts, means for automatically actuating said mechanisms in accordance with the speed of rotation of the driving shaft and with the speed of rotation of the driven shaft and means to regulate the automatically actuating means so as to vary the rate of operation of the speed change mechanisms.

6. In a device of the class described, the combination of a driving shaft, a driven shaft, a clutch, clutch release mechanism and speed change mechanisms between said shafts, means for automatically actuating said mechanisms in accordance with the speed of rotation of the driving shaft and with the speed of rotation of the driven shaft and manually operated means to regulate the automatically actuating means so as to vary the rate of operation of the speed change mechanisms.

7. In a device of the class described, the combination of a driving shaft, a driven shaft, a clutch, clutch release mechanism, gears and gear shift mechanisms between said shafts, means for automatically actuating said mechanisms in accordance with the speeds of rotation of the driving shaft and the driven shaft, and means to regulate the automatically actuating means so as to vary the rate of automatic gear shift.

8. In a device of the class described, the combination of a driving shaft, a driven shaft, a clutch, clutch release mechanism, gears and gear shift mechanisms between said shafts, means for automatically actuating said mechanisms in accordance with the speeds of rotation of the driving shaft and the driven shaft, and manually operated means to regulate the automatically actuating means so as to vary the rate of automatic gear shift.

9. In a device of the class described, the combination of a driving shaft, a driven shaft, a clutch, clutch release gears and gear shift mechanisms between said shafts, a speed controlled means, means for regulating said speed controlled means; means operated by said speed controlled means for operating the clutch and the several gear shift controlling mechanisms, said operated means normally operating in a progressively forward speed position, means cooperating therewith to move said means into a reverse speed position, means to prevent said speed controlled means from advancing to effect shifts to higher gears when reverse gear is engaged, means to move said operated means to a decreasing speed position, and means cooperating with the clutch release mechanism to bring gears to neutral before a shift of gears is made.

10. In a device of the class described, the combination of a driving shaft, a driven shaft, a clutch, clutch release, gears and gear-shift-mechanisms between said shafts, a speed controlled means, manually operated means for regulating said speed controlled means; means operated by said speed controlled means for operating the clutch and the several gear shift controlling mechanisms, said operated means normally operating in a progressively forward speed position, means cooperating therewith to move said means into a reverse speed position, means to prevent said speed controlled means from advancing to effect shifts to higher gears when reverse gear is engaged, means to move said operated means to a decreasing speed position, and means cooperating with the clutch release mechanism to bring gears to neutral before a shift of gears is made.

11. In a device of the class described, the combination of a driving shaft, a driven shaft, a clutch, clutch release gears and gear shift mechanisms between said shafts, a speed controlled means, manually operated means for regulating said speed controlled means, electrical contact means operated by said speed controlled means for operating the clutch release and the several gear shift controlling mechanisms, a means for holding said electrical contact means in position to make proper clutch release and gear shift operating mechanism contacts, a means cooperating with said gear shift operating mechanisms to release said holding means, said operated electrical contact means normally operating in a progressively forward speed position, means cooperating therewith to move said means into a reverse speed position, means to prevent the speed controlled means from advancing to effect shifts to higher gears when reverse gear is engaged, means to move said electrical contact means into a decreasing speed position, and means cooperating with the clutch release mechanism to bring gears to neutral before a shift of gears is made.

12. In a device of the class described, the combination of a driving shaft, a driven shaft, a clutch, clutch release, gears and gear shift mechanisms between said shafts, a speed controlled means, manually operated means for regulating said speed controlled means, clutch release and gear shift mechanisms, electromagnetic means for operating said mechanisms to effect a particular engagement, circuits to said electromagnetic means and including a source of current; electrical contact means operated by the said speed controlled means to actuate the electromagnetic means through the respective circuits, a means for holding said electrical contact means in position to make proper contacts to actuate the electromagnetic means to operate the clutch release and proper gear shift mechanisms, a means cooperating with said gear shift mechanisms to release said holding means, said operated electrical contact means normally operating in a progressively forward speed position, means cooperating therewith to move said means into a position to make a reverse speed contact, means to prevent the speed controlled means from advancing to effect shifts to higher gears when reverse gear is engaged, means to move said electrical contact means into a position to make decreasing speed contacts, and means cooperating with the clutch release mechanism to bring gears to neutral before a shift of gears is made.

13. In a device of the class described, the combination of a driving shaft, a driven shaft, a clutch, clutch release, gears and gear shift mechanisms between said shafts, a speed controlled means, manually operated means for regulating said speed controlled means, electromagnetic means for operating said clutch release and gear shift mechanisms, mechanisms to effect release of the clutch or particular gear engagements, circuits to said electromagnetic means and including a source of circuits; electrical contact means operated by the said speed controlled means to actuate the electromagnetic means, through the proper circuits, operating the clutch release mechanism and to actuate, after the clutch has established contact, the electromagnetic means, through the proper circuits, the electromagnetic means operating the various gear shift mechanisms; a means for holding said electrical contact means in position to make the proper contacts, a means cooperating with said gear shift mechanisms to release said operated electrical contact means manually operating in a progressively forward speed position, means cooperating therewith to move said means into a position to make a reverse speed gear contact, means to prevent the speed controlled means from advancing to effect shifts to higher gears when reverse gear is engaged, means to move said electrical contact means into a position to make decreasing speed contacts, and means cooperating with the clutch release mechanism to bring gears to neutral before a shift of gears is made.

14. In a device of the class described, the combination of a driving shaft, a driven shaft, a clutch, clutch release mechanism, gears and gear shift mechanisms between said shafts, a speed controlled means comprising centrifugal means one mounted on the driving shaft and one on the driven shaft, regulating means adapted to control means for operating the clutch release and the several gear shift operating mechanisms, means for regulating said centrifugal regulated means, said means operating the clutch release and gear shift mechanisms normally operating in a progressively forward speed position, means cooperating therewith to move said means into a reverse speed position, means to prevent said centrifugal regulated means from advancing to effect shifts to higher gears when reverse is engaged, means to move said means operating the clutch release and gear shift mechanism to a decreasing speed position, and means cooperating with the clutch release mechanism to bring gears to neutral before a shift of gears is made.

15. In a device of the class described, the combination of a driving shaft, a driven shaft, a clutch, clutch release mechanism, gears and gear shift mechanisms between said shafts, a speed controlled means comprising centrifugal means, one mounted on the driving shaft and one on the driven shaft, regulating means adapted to control means for operating the clutch release and the several gear shift operating mechanisms, manually operated means for regulating said centrifugal regulated means; means, co-operating with said means operating the clutch release and gear shift mechanisms, which normally operates in a progressively forward speed position, to move said means into a reverse speed position; means to prevent said centrifugal regulated means from advancing to effect shifts to higher gears when reverse is engaged, means to move said means operating the clutch release and gear shift mechanisms to a decreasing speed position, and means cooperating with the clutch release mechanism to bring gears to neutral before a shift of gears is made.

16. In a device of the class described, the combination of a driving shaft, a driven shaft, a clutch, clutch release mechanism, gears and gear shift mechanisms between said shafts; a speed controlled means comprising centrifugal means, one mounted on the driving shaft and one on the driven shaft, regulating means adapted to control electrical contact means for operating the clutch release and the several gear shift controlling mechanisms, manually operated means for regulating said centrifugal regulated means, a means for holding said electrical contact means in position to make proper clutch release and gear shift operating mechanisms, contacts, a means cooperating with said gear shift operating mechanisms to release said holding means, means cooperating with said electrical contact means which normally operates in a progressively forward speed position, to move said means into a reverse speed position, means to prevent the centrifugal regulated means from advancing to effect shifts to higher gears when reverse gear is engaged, means to move said electrical contact means into a decreasing speed position, and means cooperating with the clutch release mechanism to bring gears to neutral before a shift of gears is made.

17. In a device of the class described, the combination of a driving shaft, a driven shaft, a clutch, clutch release mechanism, gears and gear shift mechanisms between said shafts, a speed controlled means comprising centrifugal means one mounted on the driving shaft and one on the driven shaft and movable bars actuated thereby, manually operated means for regulating the movements of said movable bars, electromagnetic means for operating the clutch release and gear shift mechanisms to effect a particular engagement; circuits to said electromagnetic means and including a source of current, electrical contact means, operated by one of the movable bars, to actuate the electromagnetic means through the respective circuits; a means for holding said electrical contact means in position to make proper contacts to actuate the electromagnetic means to operate the clutch release and proper gear shift mechanisms; a means cooperating with said gear shift mechanisms to release said holding means, said operated electrical contact means normally operating in a progressively forward speed position; means cooperating therewith to move said means into a position to make a reverse speed contact; means to prevent the movable bars from advancing to effect shifts to higher gears when reverse gear is engaged, means to move said electrical control means into a position to make decreasing speed contacts; and means cooperating with the clutch release mechanism to bring gears to neutral before a shift of gears is made.

18. In a device of the class described, the combination of a driving shaft, a driven shaft, a clutch, clutch release mechanism, gears and gear shift mechanisms between said shafts, a speed controlled means comprising centrifugal means, one mounted on the driving shaft and one on the driven shaft and movable bars actuated thereby, manually operated means for regulating the movements of said movable bars, electromagnetic means for operating the clutch release and gear shift mechanisms to effect a particular engagement, circuits to said electromagnetic means and including a source of current, electrical contact means operated by one of the movable bars, to actuate the electromagnetic means, through the proper circuit, operating the clutch release mechanism, and to actuate after the clutch has established contact, through the proper circuits, the electromagnetic means operating the various gear shift mechanisms, a means for holding said electrical contact means in position to make the proper contacts, a means cooperating with said gear shift operating mechanisms to release said holding means normally operating in a progressively forward speed position, means cooperating therewith to move said means into a position to make a reverse speed contact, means to prevent the centrifugally regulated movable bars from advancing to effect shifts to higher gears when reverse gear is engaged, means to move said electrical contact means into a position to make decreasing speed contacts, and means cooperating with the clutch release mechanism to bring gears to neutral before a shift of gears is made.

19. In a device of the character described, the combination of a driving shaft, a driven shaft, a clutch, clutch release mechanism, gears and gear shift mechanisms between said shafts, a means for automatically actuating said mechanisms comprising speed controlled means; means operated by said speed controlled means for operating the clutch and the several gear shift controlling mechanisms, said operated means normally operating in a progressively forward speed position, means cooperating therewith, manually actuated, to move said means into a reverse speed position, means to prevent automatically said speed controlled means from advancing to effect shifts to higher gears when reverse gear is engaged, means to automatically move said operated means to a decreasing speed position, means automatically cooperating with the clutch release mechanism to bring gears to neutral before a shift of gears is made, manually operated means to regulate the automatically actuating means so as to vary the rate of automatic gear shift.

20. In a device of the class described, the combination of a driving shaft, a driven shaft, a clutch release mechanism, gears and gear shift mechanisms between said shafts, a speed controlled means, electrical contact means operated by said speed controlled means for operating the clutch release and the several gear shift controlling mechanisms, a means for automatically holding said electrical contact means in position to make proper clutch release and gear shift operating mechanisms contacts, a means cooperating with said gear shift operating mechanisms to automatically release said holding means, said operated electrical contact means normally operating in a progressively forward speed position, manually operated means cooperating therewith to move said means into a reverse speed position, means to prevent automatically the speed controlled means from advancing to effect shifts to higher gears when reverse gear is engaged, automatic means to move said electrical contact means into a decreasing speed position, means cooperating with the clutch release mechanism to automatically bring gears to neutral before a shift of gears is made, manually operated means to regulate the speed controlled means so as to vary the rate of automatic gear shift.

21. In a device of the class described, the combination of a driving shaft, a driven shaft, a clutch, clutch release mechanism, gears and gear shift mechanisms between said shafts, an automatic speed controlled means, electromagnetic means for automatically operating said clutch release and gear shift mehanisms to effect a particular engagement, circuits to said electromagnetic means and including a source of current, electrical contact means automatically operated by the engine speed and car speed controlled means to actuate the electromagnetic means through the respective circuits, a means for automatically holding said electrical contact means in a position to make proper contacts to actuate the electromagnetic means to operate the clutch release and proper gear shift mechanisms, means cooperating with said gear shift mechanisms to automatically release said holding means, said operated electrical contact means normally operating in a progressively forward speed position, manually operated means cooperating therewith to move said means into a position to make a reverse speed contact, means to prevent automatically the speed controlled means from advancing to effect shifts to higher gears when reverse gear is engaged, means to move said electrical contact means into a position to make decreasing speed contacts, means cooperating with the clutch release mechanism to automatically bring gears to neutral before a shift of gears is made, manually operated means to regulate the speed controlled means so as to vary the rate of automatic gear shift.

22. In a device of the class described, the combination of a driving shaft, a driven shaft, a clutch, clutch release mechanism, gears and gear shift mechanisms between said shafts, an automatic speed controlled means, electromagnetic means for automatically operating said mechanisms to effect a release of the clutch or particular gear engagements, circuits to said electromagnetic means and including a source of current, electrical contact means automatically operated by the engine speed and car speed controlled means to actuate the electromagnetic means through the proper circuit operating the clutch release mechanism and to automatically actuate, after the clutch has established contact, through the proper circuits, the electromagnetic means operating the various gear shift mechanisms, a means for automatically holding said electrical contact means in position to make the proper contacts; means cooperating with said gear shift mechanisms to automatically release said holding means; said electrical contact means normally operating in a progressively forward speed position; manually operated means cooperating therewith to move said means into a position to make a reverse speed contact; means to prevent automatically the speed controlled means from advancing to effect shifts to higher gears when reverse gear is engaged; means to automatically move said electrical contact means into a position to make decreasing speed contacts; means cooperating with the clutch release mechanism to automatically bring gears to neutral before a shift of gears is made; manually operated means to regulate the speed controlled means so as to vary the rate of automatic gear shift.

23. In a device of the class described, the combination of a first shaft, a second shaft, a clutch, clutch release mechanism, gears and gear shift mechanisms between said shafts, means for actuating said mechanisms in accordance with the speed of rotation of the first shaft and with the speed of rotation of the second shaft, means cooperating with the clutch release mechanism to bring gears to neutral and means to regulate the actuating means so as to vary the period between gear shifts.

24. In a device of the class described, the combination of a first shaft, a second shaft, a clutch, clutch release mechanism, gears and gear shift mechanisms between said shafts, means for automatically actuating said mechanisms in accordance with the speed of rotation of the first shaft and with the speed of rotation of the second shaft, means cooperating with the clutch release mechanism to bring gears to neutral and means to regulate the automatically actuating means so as to vary the period between automatic gear shifts.

25. In a device of the class described, the combination of a driving shaft, a driven shaft, a clutch, clutch release mechanism, gears and gear shift mechanisms between said shafts, means for actuating said mechanisms in accordance with the speeds of rotation of the driving shaft and the driven shaft, means cooperating with the clutch release mechanism to bring gears to neutral and means to regulate the actuating means so as to vary the period between gear shifts.

26. In a device of the class described, the combination of a driving shaft, a driven shaft, a clutch, clutch release mechanism, gears and gear shift mechanisms between said shafts, means for automatically actuating said mechanisms in accordance with the speeds of rotation of the driving shaft and the driven shaft, means cooperating with the clutch release mechanism to bring gears to neutral and means to regulate the automatically actuating means so as to vary the period between automatic gear shifts.

27. In combination a first shaft, a second shaft, a clutch, clutch release mechanism and speed change mechanisms between said shafts, means comprising a shaft speed controlled apparatus operating electrical contact devices for actuating said clutch, clutch release mechanism and speed change mechanisms in accordance with the speed of rotation of the first shaft and with the speed of rotation of the second shaft and means to vary the rate of response of the shaft speed controlled apparatus to the shaft speeds so as to vary the rate of operation of the speed change mechanisms.

28. In combination a driving shaft, a driven shaft, a clutch, clutch release mechanism and speed change mechanisms between said shafts, means comprising a shaft speed controlled apparatus operating electrical contact devices, for actuating said clutch, clutch release mechanism and speed change mechanisms in accordance with the speed of rotation of the driving shaft and with the speed of rotation of the driven shaft, and means to vary the rate of response of the shaft speed controlled apparatus to the shaft speeds so as to vary the rate of operation of the speed change mechanisms.

29. In combination, a first shaft, a second shaft, a clutch, clutch release mechanism and speed change mechanisms between said shafts, means for automatically successively actuating said clutch, clutch release mechanism and speed change mechanisms in accordance with the speed of rotation of the first shaft and with the speed of rotation of the second shaft, and means to regulate the automatically successively actuating means so as to vary the rate of automatic successive operation of the clutch, clutch release mechanism and speed change mechanisms.

30. In combination a first shaft, a second shaft, a clutch, clutch release mechanism and speed change mechanisms between said shafts, means comprising shaft speed controlled bars operating electrical contact devices to actuate said clutch, clutch release mechanism and speed change mechanisms in accordance with the speed of rotation of the first shaft and with the speed of rotation of the second shaft and means comprising a slidable bar, extension member thereon and pin cooperating with said shaft speed controlled bars to vary the rate of response of the shaft speed controlled bars to the shaft speeds so as to vary the rate of operation of the clutch, clutch release mechanism and speed change mechanisms.

31. In combination a driving shaft, a driven shaft, a clutch, clutch release gears and gear shift mechanisms between said shafts, a shaft speed controlled means, means for regulating said shaft speed controlled means so as to vary the rate of response of said shaft speed controlled means to the speed of the shafts; means operated by said speed controlled means for operating the clutch and the several gear shift controlling mechanisms, said operated means normally operating in a progressively forward speed position, means cooperating therewith to move said means into a reverse speed position, means to prevent said speed controlled means from advancing to effect shifts to higher gears when reverse gear is engaged, means to move said operated means to a decreasing speed position, and means cooperating with the clutch release mechanism to bring gears to neutral before a shift of gears is made.

WILLIAM L. McDONALD.